(12) United States Patent
Abe

(10) Patent No.: US 11,983,952 B2
(45) Date of Patent: May 14, 2024

(54) PHYSIQUE DETERMINATION APPARATUS AND PHYSIQUE DETERMINATION METHOD

(71) Applicant: Mitsubishi Electric Corporation, Tokyo (JP)

(72) Inventor: Koki Abe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 130 days.

(21) Appl. No.: 17/633,707

(22) PCT Filed: Sep. 5, 2019

(86) PCT No.: PCT/JP2019/034913
§ 371 (c)(1),
(2) Date: Feb. 8, 2022

(87) PCT Pub. No.: WO2021/044566
PCT Pub. Date: Mar. 11, 2021

(65) Prior Publication Data
US 2022/0319199 A1  Oct. 6, 2022

(51) Int. Cl.
*G06V 40/10* (2022.01)
*G06V 10/74* (2022.01)
*G06V 40/16* (2022.01)

(52) U.S. Cl.
CPC .......... *G06V 40/103* (2022.01); *G06V 10/761* (2022.01); *G06V 40/165* (2022.01); *G06V 40/171* (2022.01)

(58) Field of Classification Search
CPC .............. B60R 21/01538; B60R 21/16; B60R 21/01552; G06V 20/593; G06V 40/171;
(Continued)

(56) References Cited

U.S. PATENT DOCUMENTS 10,322,728 B1 * 6/2019 Porikli ................. G06V 10/764
11,256,936 B2 * 2/2022 Katsumata ........... G06V 40/172
(Continued)

FOREIGN PATENT DOCUMENTS

| JP | 11-129860 A | 5/1999 |
| JP | 2001-21426 A | 1/2001 |

(Continued)

OTHER PUBLICATIONS

International Search Report, issued in PCT/JP2019/034913, dated Nov. 26, 2019.
(Continued)

*Primary Examiner* — Shaghayegh Azima
(74) *Attorney, Agent, or Firm* — Birch, Stewart, Kolasch & Birch, LLP

(57) ABSTRACT

According to the present invention, a physique determination apparatus includes an image acquisition unit configured to acquire an image of an occupant, a facial feature point estimation unit configured to estimate facial feature points of the occupant based on the image, a head position estimation unit configured to estimate a relative position of a head of the occupant with respect to the camera based on the facial feature points, a body part estimation unit configured to estimate sizes of a plurality of parts of the occupant in the image, a skeleton estimation unit configured to estimate a skeleton size indicating an actual size of each part of the occupant based on the relative position and a size of each of the parts, and a physical determination unit configured to determine a physique of the occupant based on the skeleton size of each part of the occupant.

9 Claims, 16 Drawing Sheets

(58) Field of Classification Search
CPC ... G06V 40/165; G06V 10/761; G06V 40/103
See application file for complete search history.

(56) References Cited

U.S. PATENT DOCUMENTS

| | | | | |
|---|---|---|---|---|
| 11,488,319 | B2* | 11/2022 | Nakamatsu | ............ G06V 20/59 |
| 2007/0176402 | A1 | 8/2007 | Irie et al. | |
| 2010/0265600 | A1* | 10/2010 | Okuda | .................... B60R 1/025 |
| | | | | 359/843 |
| 2016/0368382 | A1* | 12/2016 | Schlittenbauer | ....... B60K 35/10 |
| 2018/0065582 | A1* | 3/2018 | Miller | ............... B60R 21/01552 |
| 2018/0150707 | A1* | 5/2018 | Fujii | .......................... G06T 7/70 |
| 2019/0147262 | A1* | 5/2019 | Kuehnle | .............. G06V 20/597 |
| | | | | 340/439 |
| 2019/0276044 | A1* | 9/2019 | Bae | ....................... B60R 16/023 |
| 2019/0392233 | A1* | 12/2019 | Katsumata | ........... G06V 20/593 |
| 2021/0217193 | A1* | 7/2021 | Nakamatsu | ............... G06T 7/50 |

FOREIGN PATENT DOCUMENTS

| | | | | |
|---|---|---|---|---|
| JP | 2007-198929 A | | 8/2007 | |
| JP | 2017-4339 A | | 1/2017 | |
| JP | 2018-83561 A | | 5/2018 | |
| JP | 2018-512334 A | | 5/2018 | |
| JP | 2019001273 A | * | 1/2019 | ......... B62D 15/0285 |
| WO | WO2016/164793 A1 | | 10/2016 | |
| WO | WO2021/044567 A1 | | 3/2021 | |

OTHER PUBLICATIONS

Written Opinion of the International Searching Authority, issued in PCT/JP2019/034913, dated Nov. 26, 2019.

* cited by examiner

F I G. 2
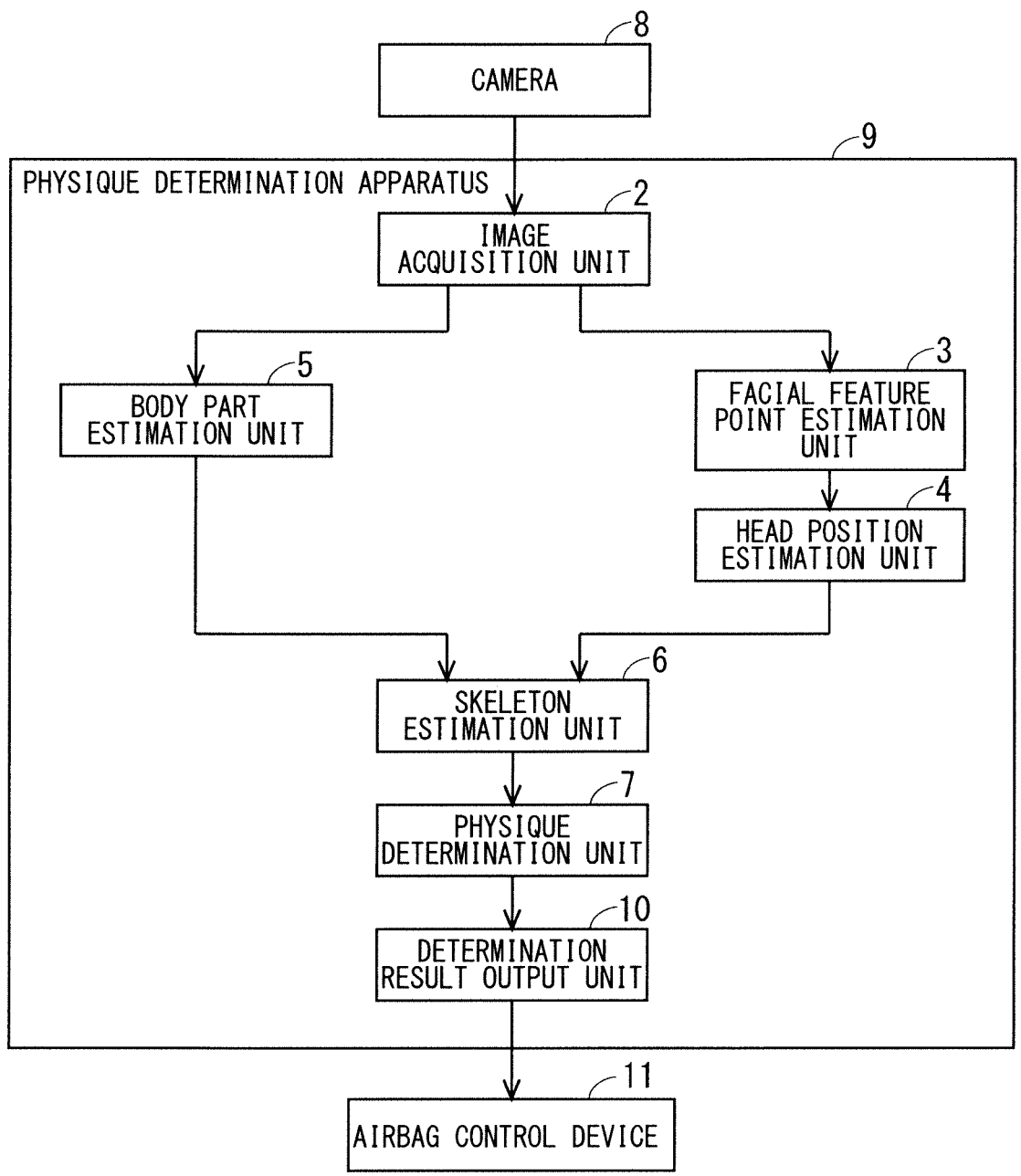

F I G. 6
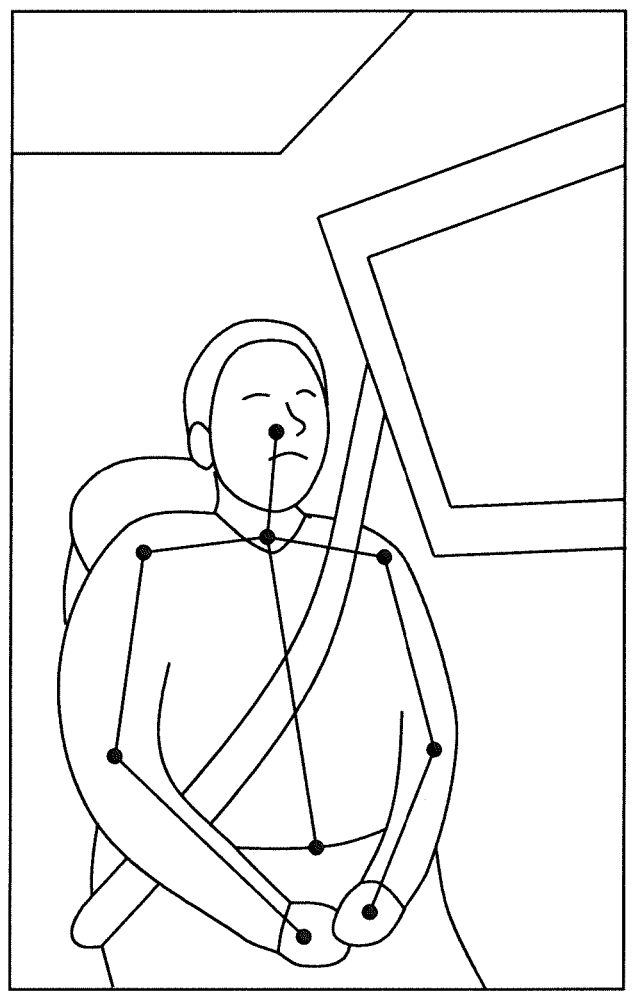

F I G. 1 5
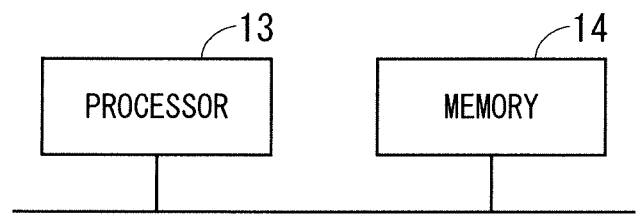

F I G. 1 6
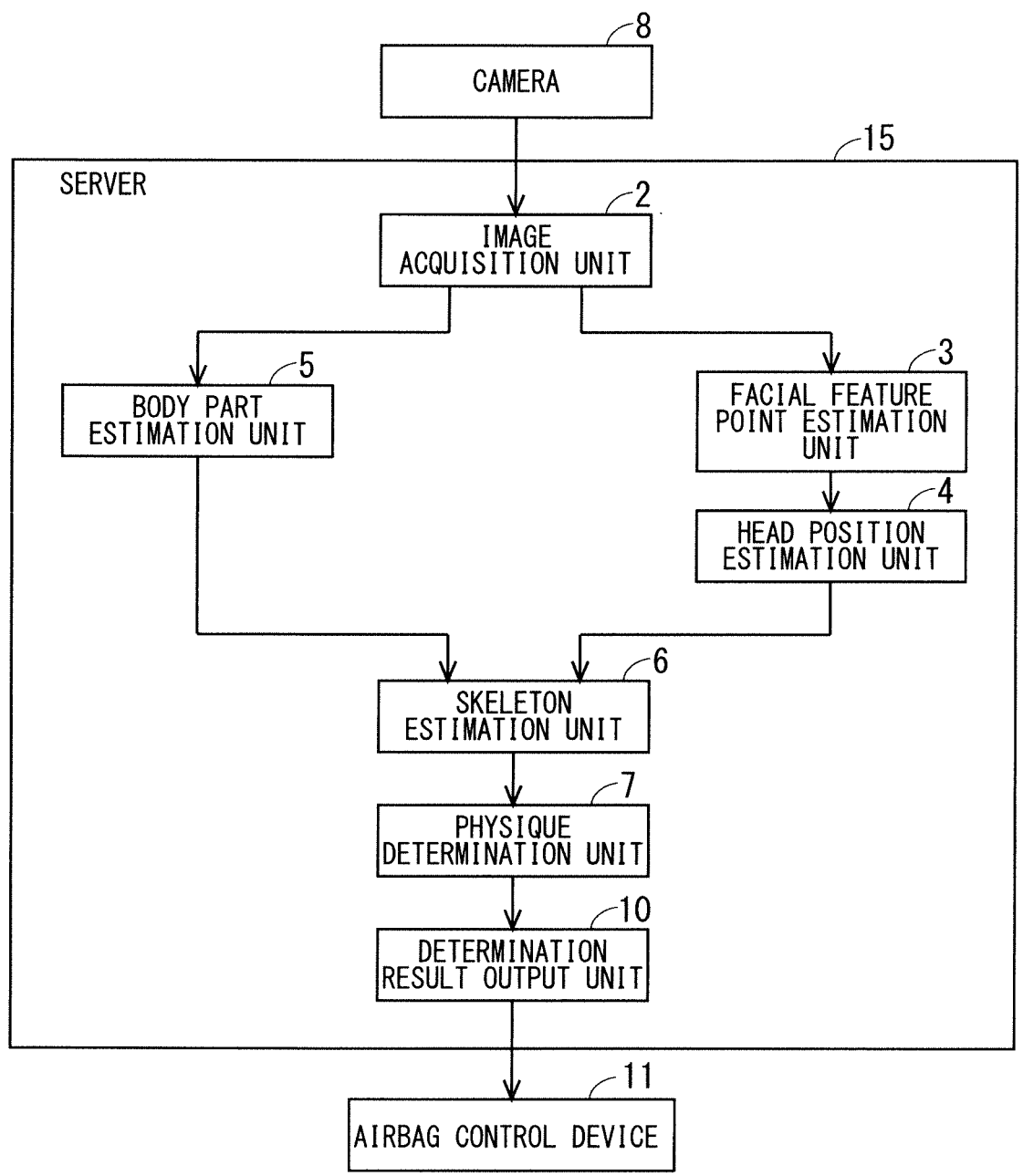

PHYSIQUE DETERMINATION APPARATUS AND PHYSIQUE DETERMINATION METHOD

TECHNICAL FIELD

The present invention relates to a physique determination apparatus and a physique determination method for determining a physique of an occupant in a vehicle.

BACKGROUND ART

Conventionally, a technique has been disclosed in which a plurality of sensors are provided in a seat in a vehicle, the load applied to the seating surface when the occupant is seated is detected by each sensor, and whether the occupant is an adult or a child is determined (see, for example, Patent Document 1). In addition, the technology is disclosed in which a grid pattern and a CCD camera are provided on the seating part of the seat in the vehicle, and the grid pattern deformed by the load applied to the seating part when the occupant is seated is photographed by the CCD camera to determine the physique of the occupant (see, for example, Patent Document 2). Patent Documents 1 and 2 refer to controlling the deployment of airbags according to the physique of a seated occupant.

PRIOR ART DOCUMENTS

Patent Documents

[Patent Document 1] Japanese Patent Application Laid-Open No. 2001-21426
[Patent Document 2] Japanese Patent Application Laid-Open No. 11-129860

SUMMARY

Problem to be Solved by the Invention

In recent years, vehicles equipped with airbags for all seats for the purpose of protecting all occupants are increased. In such a vehicle, the determination is required for the physiques of all occupants to be seated in the seats in order to control the deployment of airbags. Further, the determination result of the physique of an occupant can be used not only for controlling the deployment of the airbag but also for controlling to automatically adjust the seat position, for example. In this manner, there is an increasing demand for determining the physiques of all occupants.

In Patent Documents 1 and 2, in order to determine the physiques of all occupants of the seats, equipping sensors and the like for all seats is required, causing a problem of high total system cost.

The present invention has been made to solve such a problem, and an object of the present invention is to provide a physique determination apparatus and a physique determination method capable of inexpensively determining the physique of an occupant in a vehicle.

Means to Solve the Problem

In order to solve the above problem, according to the present invention, a physique determination apparatus includes an image acquisition unit configured to acquire an image of an occupant in a vehicle taken by a camera, a facial feature point estimation unit configured to estimate facial feature points of the occupant based on the image acquired by the image acquisition unit, a head position estimation unit configured to estimate a relative position of a head of the occupant with respect to the camera based on the facial feature points estimated by the facial feature point estimation unit, a body part estimation unit configured to estimate sizes of a plurality of parts of the occupant in the image based on the image acquired by the image acquisition unit, a skeleton estimation unit configured to estimate a skeleton size indicating an actual size of each part of the occupant based on the relative position of the head of the occupant estimated by the head position estimation unit and a size of each of the parts estimated by the body part estimation unit, and a physical determination unit configured to determine a physique of the occupant based on the skeleton size of each part of the occupant estimated by the skeleton estimation unit.

Effects of the Invention

According to the present invention, the physique determination apparatus includes the body part estimation unit that estimates the sizes of a plurality of parts of the occupant in the image based on the image acquired by the image acquisition unit, the skeleton estimation unit that estimates a skeleton size indicating the actual size of each part of the occupant based on the relative position of the head of the occupant estimated by the head position estimation unit and the size of each part estimated by the body part estimation unit, and the physique determination unit that determines the physique of the occupant based on the skeleton size of each part of the occupant estimated by the skeleton estimation unit; therefore, the physique of the occupant in the vehicle can be inexpensively determined.

The objects, features, aspects, and advantages of the present invention will become more apparent from the following detailed description and the accompanying drawings.

BRIEF DESCRIPTION OF DRAWINGS

FIG. 2 is a block diagram illustrating a configuration example of the physique determination apparatus according to Embodiment of the present invention.

FIG. 6 is a diagram illustrating an example of a plurality of parts of an occupant in an image according to Embodiment of the present invention.

FIG. 15 is a block diagram illustrating an example of a hardware configuration of the physique determination apparatus according to Embodiment of the present invention.

FIG. 16 is a block diagram illustrating a configuration example of a physique determination system according to Embodiment of the present invention.

DESCRIPTION OF EMBODIMENT(S)

Embodiment of the present invention will be described below with reference to the drawings.

Embodiment

Configuration

Figure 1:
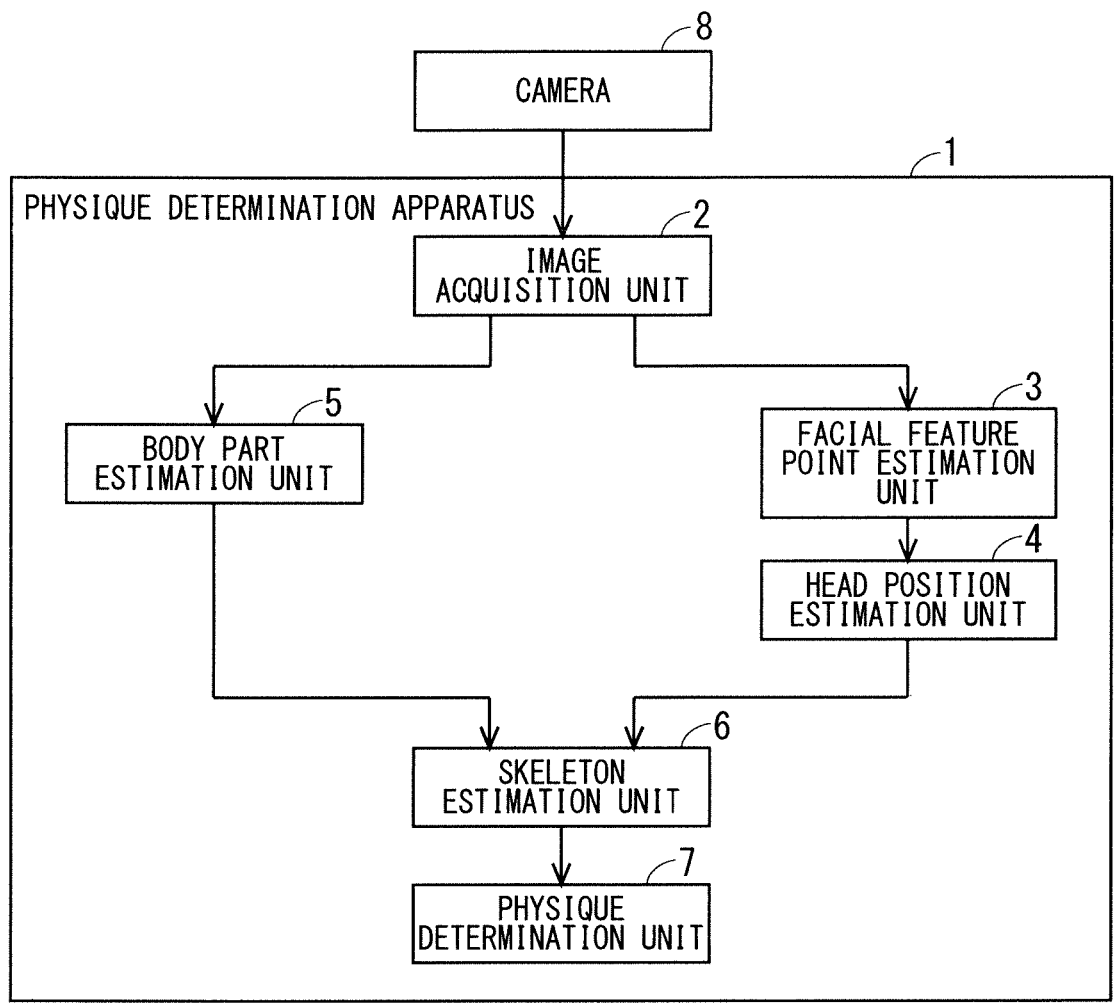
FIG. 1 is a block diagram illustrating a configuration example of a physique determination apparatus according to Embodiment of the present invention.

FIG. 1 is a block diagram illustrating a configuration example of the physique determination apparatus 1 according to Embodiment. Note that FIG. 1 illustrates the minimum necessary configuration for configuring the physique determination apparatus according to Embodiment. It is assumed that the physique determination apparatus 1 is mounted in a vehicle.

As illustrated in FIG. 1, the physique determination apparatus 1 includes an image acquisition unit 2, a facial feature point estimation unit 3, a head position estimation unit 4, a body part estimation unit 5, a skeleton estimation unit 6, and a physique determination unit 7. Further, the image acquisition unit 2 is connected to a camera 8. The camera 8 is mounted in the vehicle.

The image acquisition unit 2 acquires an image of an occupant in the vehicle taken by the camera 8. The facial feature point estimation unit 3 acquires facial feature points of the occupant based on the image acquired by the image acquisition unit 2. The head position estimation unit 4 estimates the relative position of the head of the occupant with respect to the camera 8 based on the facial feature points estimated by the facial feature point estimation unit 3. The body part estimation unit 5 estimates the sizes of a plurality of parts of the occupant in the image based on the image acquired by the image acquisition unit 2. The skeleton estimation unit 6 estimates a skeleton size indicating the actual size of each part of the occupant based on the relative position of the head of the occupant estimated by the head position estimation unit 4 and the size of each part estimated by the body part estimation unit 5. The physique determination unit 7 determines the physique of the occupant based on the skeleton size of each part of the occupant estimated by the skeleton estimation unit 6.

Next, another configuration of the physique determination apparatus including the physique determination apparatus 1 illustrated in FIG. 1 will be described.

FIG. 2 is a block diagram illustrating a configuration example of the physique determination apparatus 9 according to another configuration. It is assumed that the physique determination apparatus 9 is mounted in a vehicle.

As illustrated in FIG. 2, the physique determination apparatus 9 includes the image acquisition unit 2, the facial feature point estimation unit 3, the head position estimation unit 4, the body part estimation unit 5, the skeleton estimation unit 6, the physique determination unit 7, and a determination result output unit 10. Further, the image acquisition unit 2 is connected to the camera 8. The determination result output unit 10 is connected to an airbag control device 11. The airbag control device 11 is mounted in the vehicle.

Figure 3:
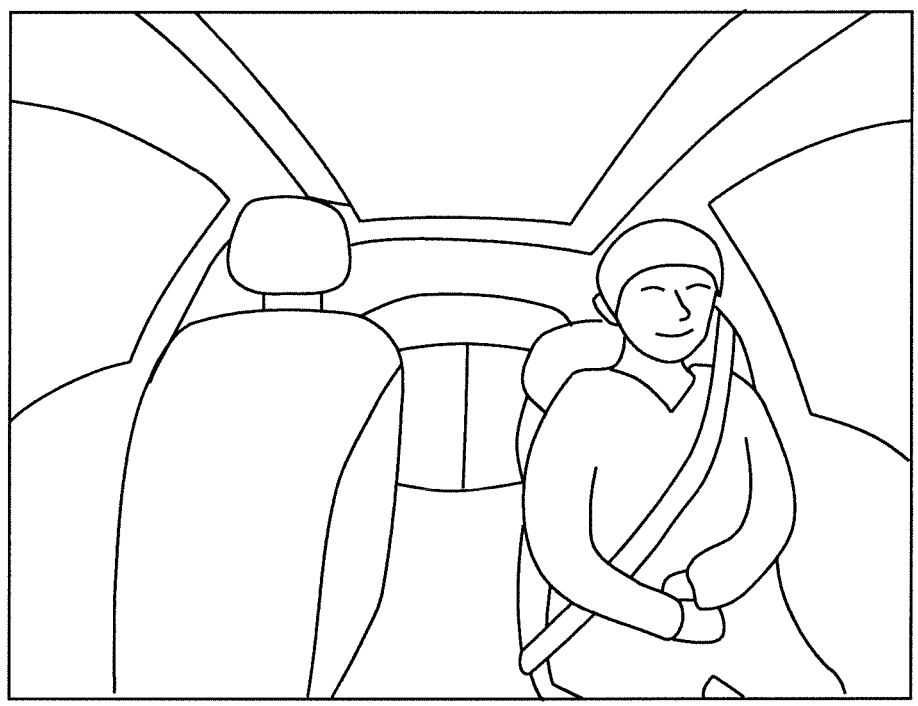
FIG. 3 is a diagram illustrating an image example taken by a camera according to Embodiment of the present invention.

The image acquisition unit 2 acquires an image of an occupant in the vehicle taken by the camera 8. The camera 8 photographs occupants seated in the driver's seat, the passenger seat, and the rear seat, respectively. FIG. 3 is a diagram illustrating an image example of an occupant seated in the passenger seat. Although the example of FIG. 3 illustrates a case where the occupant is seated in the passenger seat, Embodiment is not limited thereto. The image taken by the camera 8 may include an occupant seated in the driver's seat and an occupant seated in the rear seat.

The facial feature point estimation unit 3 estimates facial feature points of the occupant based on the image acquired by the image acquisition unit 2. Specifically, the facial feature point estimation unit 3 estimates facial feature points indicating positions such as, a face, eyes, a nose and the like of the occupant included in the image acquired by the image acquisition unit 2 by collating the image acquired by the image acquisition unit 2 with a learning dictionary (not illustrated) prepared in advance. In the learning dictionary, the feature points of the faces of a plurality of people are recorded. When the image includes a plurality of occupants, the facial feature point estimation unit 3 estimates the facial feature points of each occupant.

Figure 4:
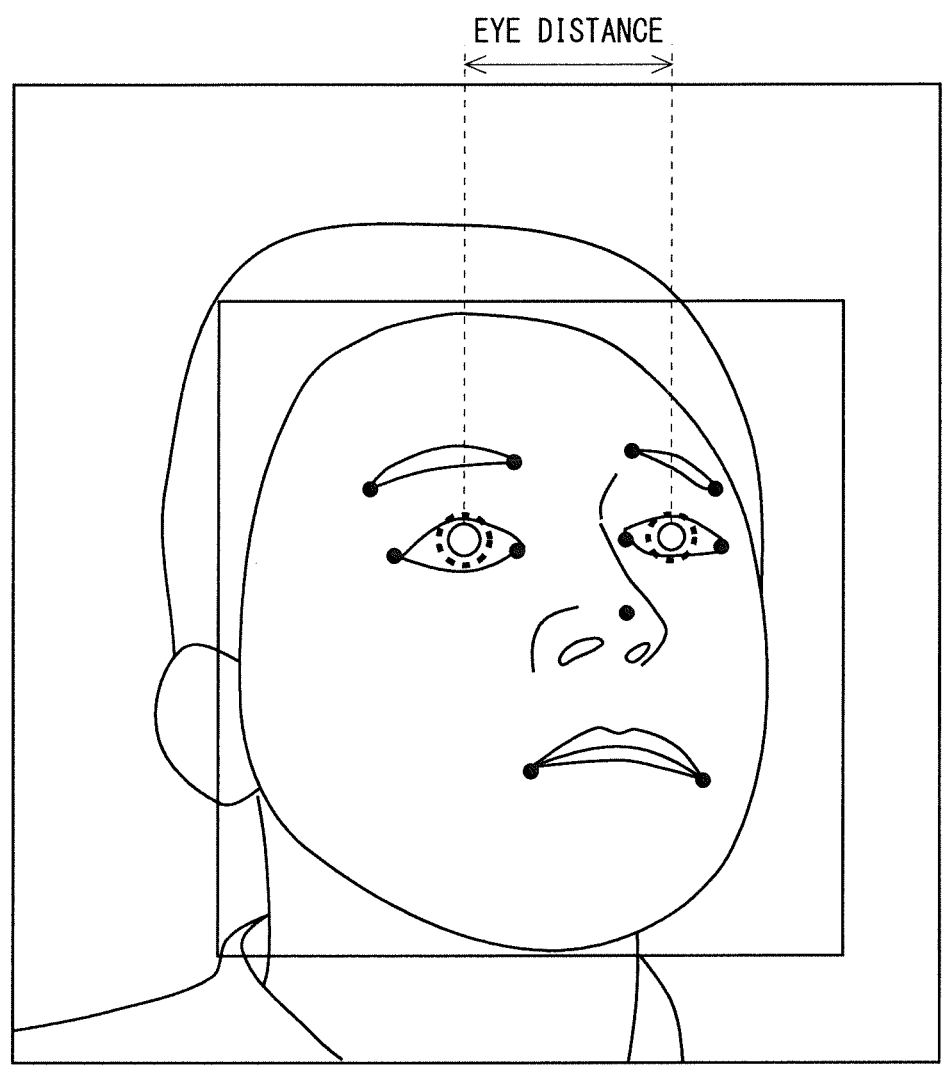
FIG. 4 is a diagram illustrating an example of facial feature points according to Embodiment of the present invention.

FIG. 4 is a diagram illustrating an example of the facial feature points of the occupant estimated by the facial feature point estimation unit 3. The occupant illustrated in FIG. 4 is seated in the passenger seat. In FIG. 4, the line squarely surrounding the face of the occupant indicates the position of the face of the occupant. The dashed circles in the centers of the eyes of the occupant indicate the position and size of the pupils of the occupant. A plurality of dots illustrated on the face of the occupant indicate the positions of both ends of the eyebrows, the positions of both ends of the eyes, the position of the tip of the nose, and the positions of both ends of the mouth. The eye distance indicates the distance between both eyes of the occupant, specifically indicates the distance between the centers of each pupil. What the facial feature point estimation unit 3 estimates is not limited to the facial feature points illustrated in FIG. 4, and may estimate other facial feature points.

The head position estimation unit 4 estimates the relative position of the head of the occupant with respect to the camera 8 based on the facial feature points estimated by the facial feature point estimation unit 3. Specifically, the head position estimation unit 4 estimates the physical relative position of the head of the occupant with respect to the camera 8 based on the distance between the eyes or the size of the pupils of the occupant estimated by the facial feature point estimation unit 3. That is, the head position estimation unit 4 estimates the distance between the camera 8 and the head of the occupant.

In Embodiment, the relative position of the head of the occupant with respect to the camera 8 is estimated based on the distance between the eyes or the size of the pupils of the occupant, which is less affected by any size of physique. Accordingly, regardless of the physique of the occupant, the relative position of the head of the occupant with respect to the camera 8 is estimated with a great accuracy. Also, even when the seat position in which the occupant is seated changes, the relative position of the head of the occupant with respect to the camera 8 is estimated with a great accuracy in accordance with the change.

The body part estimation unit 5 estimates the sizes of a plurality of parts of the occupant in the image based on the image acquired by the image acquisition unit 2. Specifically, the body part estimation unit 5 estimates a size and position of each part such as the neck, arms, and upper body of the occupant in the image included in the image acquired by the image acquisition unit 2 by collating the image acquired by the image acquisition unit 2 with a learning dictionary (not illustrated) prepared in advance. In the learning dictionary, the size and position of each part of a plurality of people in the image are recorded. When the image includes a plurality of occupants, the body part estimation unit 5 estimates a plurality of parts of each occupant.

Figure 5:
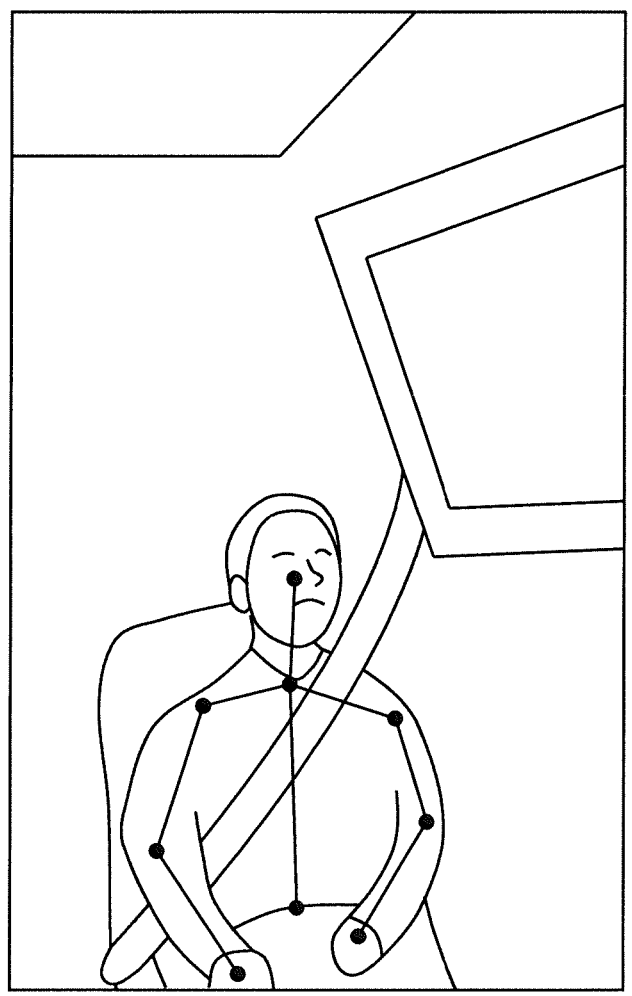
FIG. 5 is a diagram illustrating an example of a plurality of parts of an occupant in an image according to Embodiment of the present invention.
Figure 7:
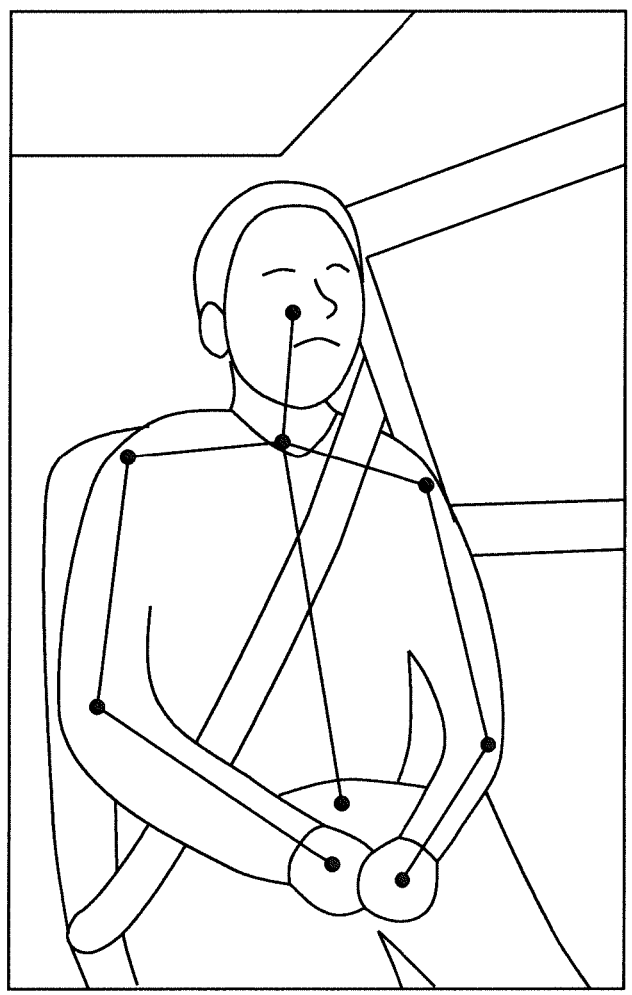
FIG. 7 is a diagram illustrating an example of a plurality of parts of an occupant in an image according to Embodiment of the present invention.

FIGS. 5 to 8 are diagrams illustrating an example of the size and position of a plurality of parts of the occupant in the image acquired by the image acquisition unit 2. FIGS. 5 to 7 illustrate the size and position of each part of the occupants with different physiques. In FIGS. 5 to 8, the straight line segments connecting each point correspond to the parts of the occupant, and the unit of the size of each part is pixel (pix). For example, a double-headed arrow illustrated in FIG. 8 indicates the shoulder width of the occupant (n pixels).

The skeleton estimation unit 6 estimates the skeleton size indicating the actual size of each part of the occupant based on the relative position of the head of the occupant with respect to the camera 8 estimated by the head position estimation unit 4 and the size of each part of the occupant in the image estimated by the body part estimation unit 5. Specifically, the skeleton estimation unit 6 converts the size of each part of the occupant in the image estimated by the body part estimation unit 5 into a skeleton size indicating the actual size of each part of the occupant. When there are a plurality of occupants, the skeleton estimation unit 6 estimates the skeleton size of each part of each occupant.

Here, a case where the skeleton estimation unit 6 converts the shoulder width of the occupant in the image estimated by the body part estimation unit 5 into the actual shoulder width will be described with reference to FIGS. 8 and 9.

Figure 8:
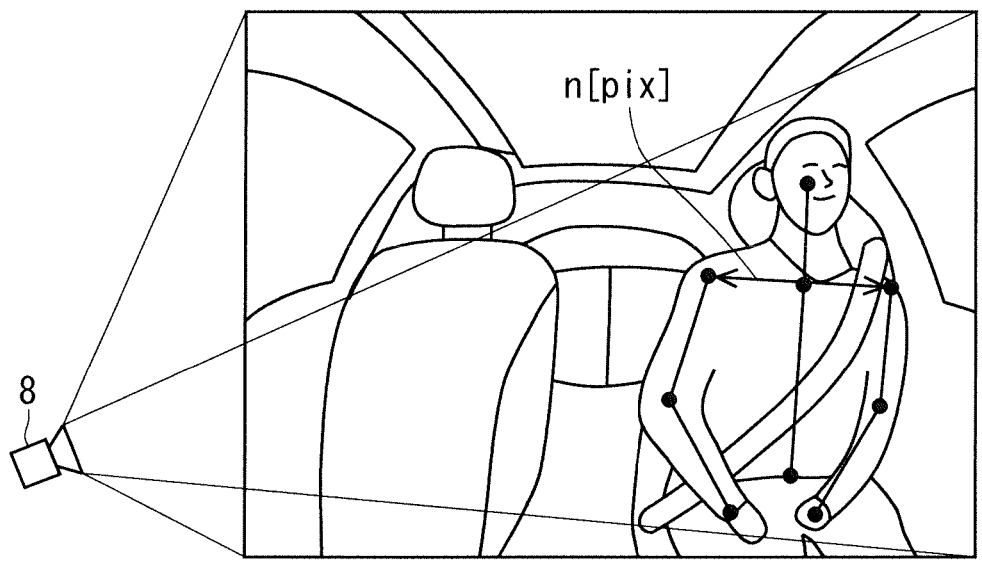
FIG. 8 is a diagram illustrating an example of a plurality of parts of an occupant in an image according to Embodiment of the present invention.
Figure 9:
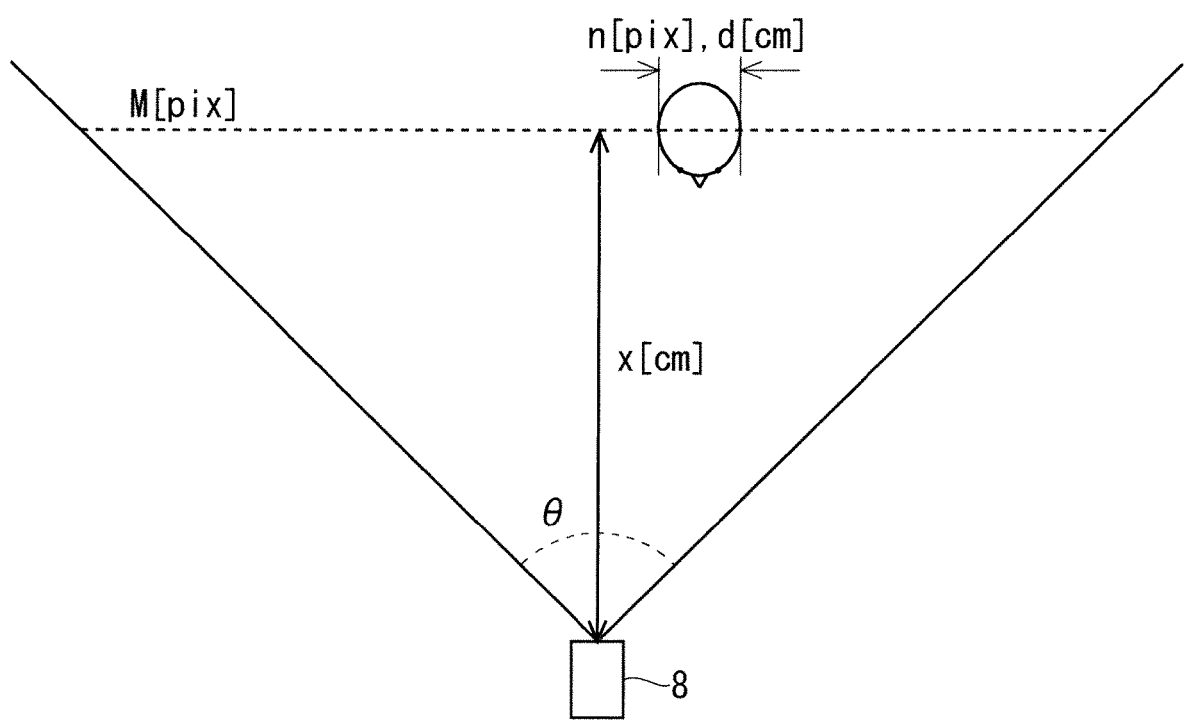
FIG. 9 is a diagram for explaining estimation of the skeleton size according to Embodiment of the present invention.

In FIG. 9, n represents the size of the shoulder width in the image, and corresponds to n illustrated in FIG. 8, d represents the actual shoulder width. M represents the width of the image, which is determined by the angle of view θ of the camera 8. x represents the distance between the camera 8 and the head of the occupant, and corresponds to the relative position of the head of the occupant with respect to the camera 8 estimated by the head position estimation unit 4. The skeleton estimation unit 6 calculates the skeleton size being the actual shoulder width d, in accordance with following Equation (1).

[Expression 1]

$$d = \frac{Mn}{2 \times \tan(\theta/2)} \quad (1)$$

As illustrated in above Equation (1), the skeleton estimation unit 6 calculates the skeleton size using the relative position of the head of the occupant with respect to the camera 8 estimated by the head position estimation unit 4. Therefore, even when the seat position in which the occupant is seated changes, the skeleton estimation unit 6 accurately calculates the skeleton size of each part of the occupant.

Although in the above description, the case of converting the shoulder width of the occupant has been described, other parts of the occupant can be converted in the same manner. For example, the skeleton estimation unit 6 estimates at least two skeleton sizes from the sitting height, the shoulder width, the face size, and the arm length of the occupant.

The size of each part of the occupant in the image can be converted to a skeleton size that indicates the actual size of each part of the occupant because all parts of the occupant are assumed to exist at the relative position of the head of the occupant with respect to the camera 8. It can be assumed that, although the shoulders, spine, and face are approximately the same as the relative position of the head of the occupant with respect to the camera 8, this is not the case as the arms are allowed for large movement around the shoulders. For the arms, the body part estimation unit 5 may estimate the maximum arm size as the arm size of the occupant when the arm size is maximized through a change over time in the image. In this case, the skeleton estimation unit 6 converts the arm size in the image estimated by the body part estimation unit 5 into the actual arm size.

The physique determination unit 7 determines the physique of the occupant based on the skeleton size of each part of the occupant estimated by the skeleton estimation unit 6. Specifically, the physique determination unit 7 inputs at least two skeleton sizes from the sitting height, shoulder width, face size, and arm length of the occupant estimated by the skeleton estimation unit 6 into a learned learner (not illustrated) that has been subjected to machine learning to determine the physique of the occupant, and executes the arithmetic processing of the learned learner; thereby, obtaining the determination result of the physique of the occupant from the learner. When there are a plurality of occupants, the physique determination unit 7 determines the physique of each occupant.

Figure 10:
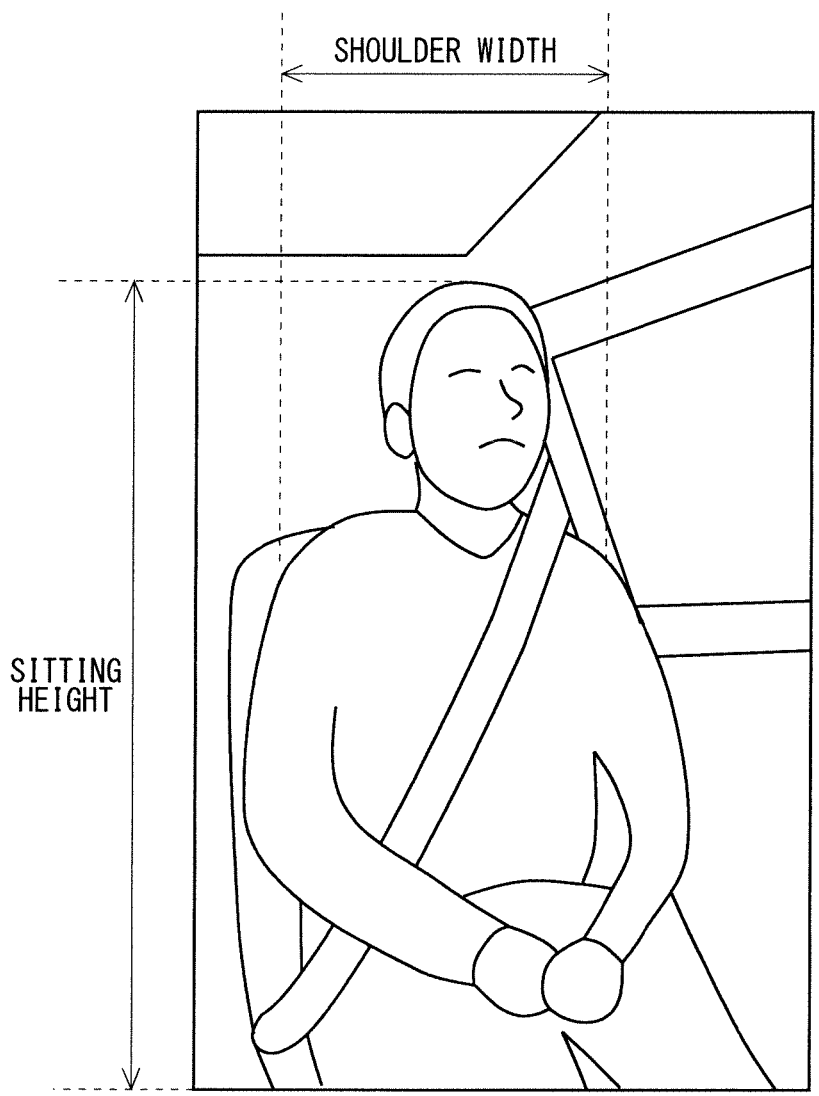
FIG. 10 is a diagram for explaining determination of the physique of an occupant according to Embodiment of the present invention.

The learner has a Gaussian Mixture Model constructed from statistical data on the skeleton size of each part of a plurality of people. For example, when the respective skeleton sizes of the sitting height and shoulder width of the occupant as illustrated in FIG. 10 are input to the learner, the learner plots the respective skeletal sizes of the sitting height and the shoulder width in the Gaussian Mixture Model constructed from statistical data on respective skeleton sizes of sitting height and shoulder width and calculates the likelihood for each of a plurality of predetermined physique classes. Then, the learner determines that the class with the highest likelihood is the physique class of the occupant. The physique determination unit 7 acquires the determination result of the physique of the occupant from the learner, and classifies the physique of the occupant into classes in accordance with the physique of the occupant.

Figure 11:
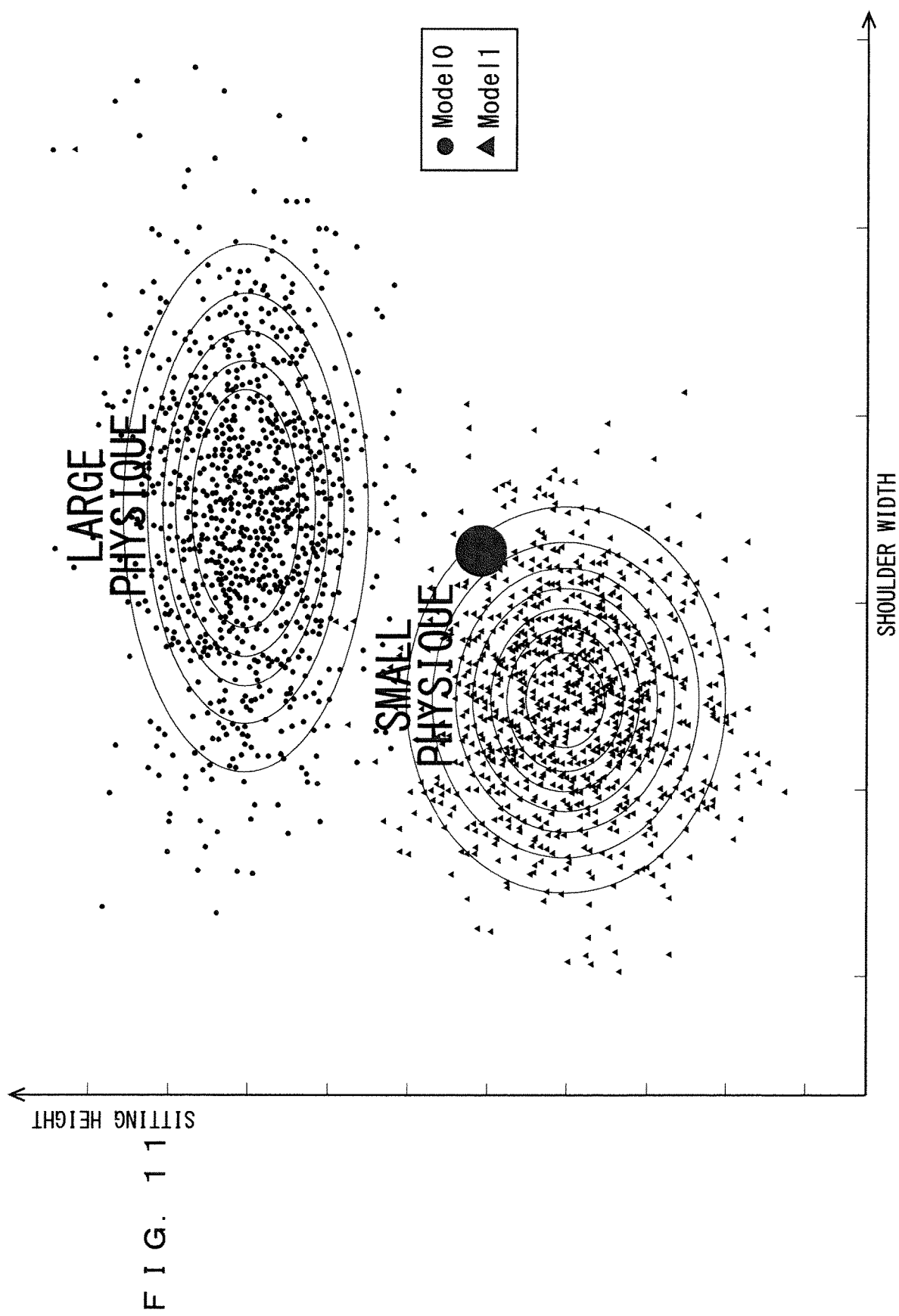
FIG. 11 is a diagram for explaining determination of the physique of an occupant according to Embodiment of the present invention.

The physique class is determined, for example, based on the classification used in airbag control or seat position control. When there are two classes for classification, the physique of the occupant is classified into, for example, "large" or "small". In addition, when there are three classes for classification, the physique of the occupant is classified into, for example, "large", "medium", or "small". The learner has the Gaussian Mixture distribution for the number of classes. In the example of FIG. 11, it is illustrated that the physique of the occupant is classified as "small" from the respective skeleton sizes of the sitting height and shoulder width of the occupant illustrated in FIG. 10. Accordingly, there is a correlation between the skeleton size of the occupant and the physique of the occupant.

Although in the above description, the case where the physique of the occupant is determined from the two skeleton sizes has been described, Embodiment is not limited thereto, and the physique of the occupant may be determined from three or more skeleton sizes. In this case, the Gaussian Mixture Model is constructed with statistical data of three or more skeleton sizes.

The determination result output unit 10 outputs the physique of the occupant determined by the physique determination unit 7 to the airbag control device 11. Specifically, the determination result output unit 10 outputs the physique class of the occupant to the airbag control device 11.

The airbag control device 11 controls the deployment of the airbag in accordance with the physique class of the occupant. For example, suppose that the physique classes of the occupant are classified into three categories: "large", "medium", and "small". When "medium" is set as the standard, when it is "large", the airbag control device 11 controls to apply a stronger force for the deployment of the airbag and deploy the airbag larger than that when it is "medium", and when it is "small", the airbag control device 11 controls to apply a weaker force for the deployment of the airbag and deploy the airbag smaller than that when it is "medium".

Although in the above description, the case where the physique class of the occupant is output to the airbag control device 11 has been described, Embodiment is not limited thereto. In the following, an output example of the physique class of the occupant will be described.

For example, the determination result output unit 10 may output the physique class of the occupant to a seat position adjustment device that automatically adjusts the seat position. In this case, the seat position adjustment device automatically adjusts the seat position in accordance with the physique class of the occupant. When there are a plurality of occupants, the seat position adjustment device automatically adjusts the position for each seat in which each occupant is seated in accordance with the physique class of each occupant.

The determination result output unit 10 may output the physique class of the occupant to a side mirror position adjustment device that automatically adjusts the position of the side mirror. In this case, the side mirror position adjustment device automatically adjusts the position of the side mirror in accordance with the physique of the occupant.

The determination result output unit 10 may output the physique class of the occupant to a steering wheel position adjustment device that automatically adjusts the steering wheel position. In this case, the steering wheel position adjustment device automatically adjusts the position of the steering wheel in accordance with the physique of the occupant.

The determination result output unit 10 may output the physique class of the occupant to an abandonment detection device that detects whether or not a child is abandoned in the vehicle. In this case, the abandonment detection device may determine whether or not the child is a child from the physique of the occupant, and may determine that the abandonment has occurred when only the child is present in the vehicle for a certain period of time.

Operation

Figure 12:
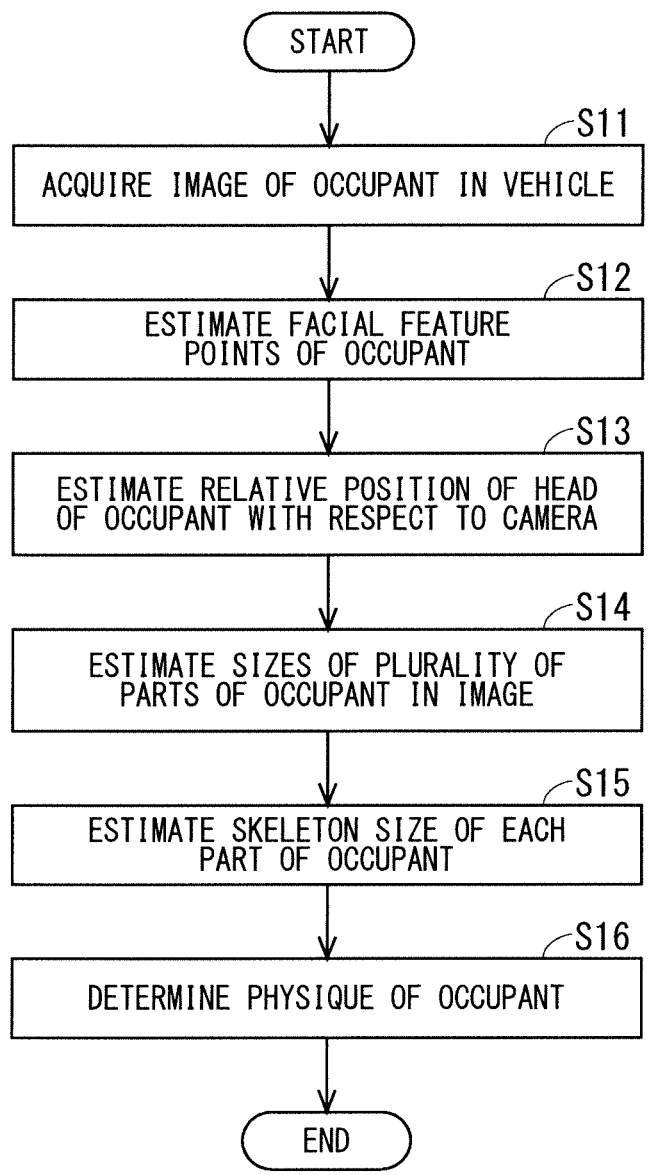
FIG. 12 is a flowchart illustrating an operation example of the physique determination apparatus according to Embodiment of the present invention.

FIG. 12 is a flowchart illustrating an operation example of the physique determination apparatus 1 illustrated in FIG. 1.

In Step S11, the image acquisition unit 2 acquires an image of an occupant in the vehicle taken by the camera 8. In Step S12, the facial feature point estimation unit 3 estimates facial feature points of the occupant based on the image acquired by the image acquisition unit 2.

In Step S13, the head position estimation unit 4 estimates the relative position of the head of the occupant with respect to the camera 8 based on the facial feature points estimated by the facial feature point estimation unit 3. In Step S14, the body part estimation unit 5 estimates the sizes of a plurality of parts of the occupant in the image based on the image acquired by the image acquisition unit 2.

In Step S15, the skeleton estimation unit 6 estimates a skeleton size indicating the actual size of each part of the occupant based on the relative position of the head of the occupant estimated by the head position estimation unit 4 and the size of each part estimated by the body part estimation unit 5. In Step S16, the physique determination unit 7 determines the physique of the occupant based on the skeleton size of each part of the occupant estimated by the skeleton estimation unit 6.

Figure 13:
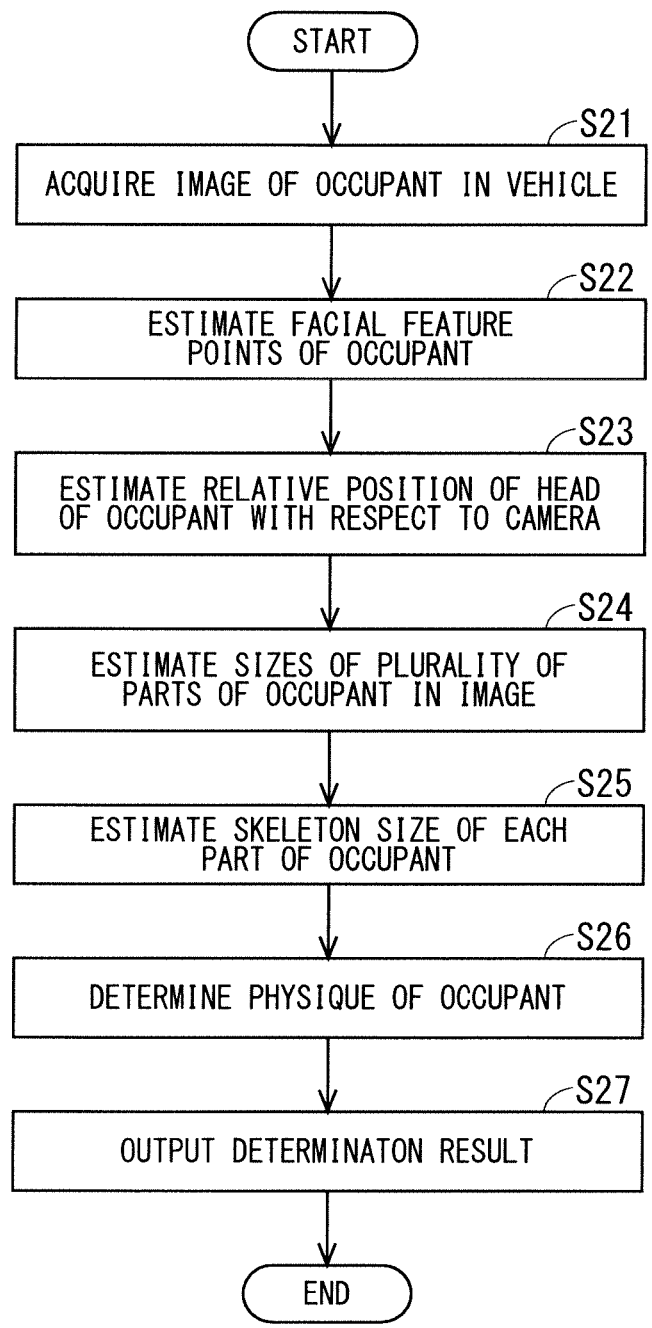
FIG. 13 is a flowchart illustrating an operation example of the physique determination apparatus according to Embodiment of the present invention.

FIG. 13 is a flowchart illustrating an example of the operation of the physique determination apparatus 9 illustrated in FIG. 2. Steps S21 to S26 in FIG. 13 correspond to Steps S11 to S16 in FIG. 12; therefore, description thereof will be omitted here. In the following, Step S27 will be described.

In Step S27, the determination result output unit 10 outputs the physique of the occupant determined by the physique determination unit 7. In the example of FIG. 2, the determination result output unit 10 outputs the physique class of the occupant determined by the physique determination unit 7 to the airbag control device 11.

Effect

According to Embodiment, the skeleton size indicating the actual size of each part of the occupant is estimated based on the relative position of the head of the occupant with respect to the camera 8 and the size of a plurality of parts of the occupant in the image and the physique of the occupant is determined based on the skeleton size, Consequently, the physique of all occupants in the vehicle can be determined by a single camera mounted in the vehicle, and this ensures a less expensive determination of the physiques of occupants than that by the conventional system in which sensors are provided in all seats.

In addition, the head position estimation unit 4 estimate the relative position of the head of the occupant with respect to the camera 8 based on the distance between the eyes or the size of the pupils of the occupant, which is less affected by any size of physique. The skeleton estimation unit 6 can accurately calculate the skeleton size of each part of the occupant using the accurately estimated relative position of the occupant. The physique determination unit 7 can determine the accurate physique of the occupant based on the accurate skeleton size of each part of the occupant. That is, the physique determination unit 7 can determine the accurate physique of the occupant even when the seat position in which the occupant is seated changes. Accordingly, the physique determination apparatuses 1 and 9 can accurately determine the physique of the occupant seated in the seat m the vehicle.

Hardware Configuration

Each function of the image acquisition unit 2, the facial feature point estimation unit 3, the head position estimation unit 4, the body part estimation unit 5, the skeleton estimation unit 6, the physique determination unit 7, and the determination result output unit 10 in the physique determination apparatuses 1 and 9 described above is realized by a processing circuit. That is, the physique determination apparatuses 1 and 9 include a processing circuit for acquiring the image of the occupant in the vehicle taken by the camera, estimating the facial feature points of the occupant, estimating the relative position of the head of the occupant with respect to the camera, estimating the sizes of a plurality of parts of the occupant in the image, estimating the skeleton size indicating the actual size of each part of the occupant, determining the physique of the occupant, and outputting the physique of the occupant. For the processing circuit, dedicated hardware may be applied, or a processor (also referred to as a Central Processing Unit (CPU), a central processing unit, a processing unit, an arithmetic unit, a microprocessor, a microcomputer, a Digital Signal Processor (DSP)) that executes a program stored in a memory may also be applied.

Figure 14:
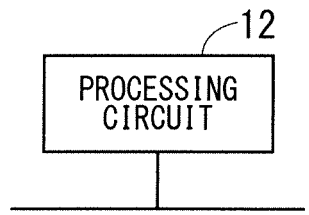
FIG. 14 is a block diagram illustrating an example of a hardware configuration of the physique determination apparatus according to Embodiment of the present invention.

When the dedicated hardware is applied to the processing circuit, as illustrated in FIG. 14, a processing circuit 12 corresponds, for example, to a single circuit, a composite circuit, a programmed processor, a parallel programmed processor, an Application Specific Integrated Circuit (ASIC), or a Field-Programmable Gate Array (FPGA), or the combination thereof. While each function of the image acquisition unit 2, the facial feature point estimation unit 3, the head position estimation unit 4, the body part estimation unit 5, the skeleton estimation unit 6, the physique determination unit 7, and the determination result output unit 10 may be realized by the processing circuit 12, respectively, or may also be realized by one processing circuit 12.

When a processor 13 illustrated in FIG. 15 is applied to the processing circuit 12, each function of the image acquisition unit 2, the facial feature point estimation unit 3, the head position estimation unit 4, the body part estimation unit 5, the skeleton estimation unit 6, the physique determination unit 7, and the determination result output unit 10 is realized by software, firmware, or a combination of software and firmware. The software or firmware is written as a program and stored in a memory 14. The processor 13 realizes each function by reading and executing the program recorded in the memory 14. That is, the physique determination apparatuses 1 and 9 include the memory 14 for storing the program which, eventually, executes the steps of acquiring the image of the occupant in the vehicle taken by the camera, estimating facial feature points of the face of the occupant, estimating the relative position of the head of the occupant with respect to the camera, estimating the sizes of a plurality of parts of the occupant in the image, estimating the skeleton size indicating the actual size of each part of the occupant, determining the physique of the occupant, and outputting the physique of the occupant. Further, it can be said that these programs are programs to execute the procedure and method of the image acquisition unit 2, the facial feature point estimation unit 3, the head position estimation unit 4, the body part estimation unit 5, the skeleton estimation unit 6, the physique determination unit 7, and the determination result output unit 10. Here, the memory may be, for example, a non-volatile or volatile semiconductor memory, such as a Random Access Memory (RAM), a Read Only Memory (ROM), a flash memory, an Erasable Programmable Read Only Memory (EPROM), an Electrically Erasable Programmable Read Only Memory (EEPROM), or the like, a magnetic disk, a flexible disk, an optical disk, a compact disk, a digital versatile disc (DVD) or the like, or any storage medium used in the future.

For each function of the image acquisition unit 2, the facial feature point estimation unit 3, the head position estimation unit 4, the body part estimation unit 5, the skeleton estimation unit 6, the physique determination unit 7, and the determination result output unit 10, part of functions thereof may be realized by dedicated hardware and another part of the components is realized by software or the like.

Accordingly, the processing circuit can realize the above each function by hardware, software, firmware, or a combination thereof.

System Configuration

The physique determination apparatus described above is applicable, not only to an in-vehicle navigation device, that is, a car navigation device, but also to a Portable Navigation Device (PND) being mountable on a vehicle, and a navigation device constructed as a system by appropriately combining servers installed outside the vehicle, or devices other than navigation devices. In this case, each function or each component of the physique determination apparatus is distributed and arranged in each function for constructing the above system.

Specifically, as an example, the function of the physique determination apparatus can be arranged on the server. For example, as illustrated in FIG. 16, the vehicle includes the camera 8 and the airbag control device 11. Further, a server 15 includes the image acquisition unit 2, the facial feature point estimation unit 3, the head position estimation unit 4, the body part estimation unit 5, the skeleton estimation unit 6, the physique determination unit 7, and the determination result output unit 10. With such a configuration, a physique determination system can be constructed.

As described above, even if each function of the physique determination apparatus is distributed and arranged in each function for constructing the system, the same effect as that of above Embodiment can be obtained.

Further, software that executes the operation according to above Embodiment may be incorporated into, for example, a server. The physique determination method realized by the server executing the software includes acquiring the image of the occupant in the vehicle taken by the camera, estimating facial feature points of the occupant based on the acquired image, estimating the relative position of the head of the occupant with respect to the camera based on the estimated facial feature points, estimating the sizes of a plurality of parts of the occupant in the image based on the acquired image, estimating the skeleton size indicating the actual size of each part of the occupant based on the estimated relative position of the head and the estimated size of each part, and determining the physique of the occupant based on the estimated skeleton size of each part of the occupant.

As described above, by incorporating the software that executes the operation in above Embodiment into the server and operating the server, the same effect as that in above Embodiment can be obtained.

The present invention can be combined, appropriately modified or omitted, without departing from the scope of the invention.

While the invention has been described in detail, the foregoing description is in all aspects illustrative and not restrictive. It is understood that numerous other modifications and variations can be devised without departing from the scope of the invention.

EXPLANATION OF REFERENCE SIGNS 1 physique determination apparatus, 2 image acquisition unit, 3 facial feature point estimation unit, 4 head position estimation unit, 5 body part estimation unit, 6 skeleton estimation unit, 7 physique determination unit, 8 camera, 9 physique determination apparatus, 10 determination result output unit, 11 airbag control device, 12 processing circuit, 13 processor, 14 memory, 15 server.

The invention claimed is:

1. A physique determination apparatus comprising:
a processor to execute a program, and
a memory to store the program which, when executed by the processor, performs processes of,
acquiring an image of an occupant in a vehicle taken by a camera,
estimating facial feature points of the occupant based on the acquired image,
estimating a distance between the camera and a head of the occupant based on the estimated facial feature points,
estimating sizes of parts of the occupant in the image based on the acquired image,
estimating a skeleton size indicating an actual size of each part of the occupant based on the estimated distance and the estimated sizes of the parts of the occupant from the image, and
determining a physique of the occupant based on the estimated skeleton size of the occupant.

2. The physique determination apparatus according to claim 1, wherein
estimating the distance includes estimating the distance based on a distance between eyes of the occupant.

3. The physique determination apparatus according to claim 1, wherein
estimating the skeleton size includes estimating at least two skeleton sizes from a sitting height, a shoulder width, a face size, and an arm length of the occupant.

4. The physique determination apparatus according to claim 3, wherein
determining the physique includes inputting the at least two skeleton sizes from the sitting height, the shoulder width, the face size, and the arm length into a learned learner subjected to machine learning to determine the physique of the occupant, and executing arithmetic processing of the learned learner; thereby, obtaining a determination result of the physique of the occupant from the learner.

5. The physique determination apparatus according to claim 1, wherein
determining the physique includes classifying the physique of the occupant into a plurality of predetermined classes in accordance with the physique of the occupant.

6. The physique determination apparatus according to claim 1, further comprising
outputting the determined physique of the occupant.

7. A physique determination method, comprising the steps of
acquiring an image of an occupant in a vehicle taken by a camera;
estimating facial feature points of the occupant based on the acquired image;
estimating a distance between the camera and a head of the occupant based on the estimated facial feature points;
estimating sizes of parts of the occupant in the image based on the acquired image;
estimating a skeleton size indicating an actual size of each part of the occupant based on the estimated distance and the estimated sizes of the parts of the occupant from the image; and
determining a physique of the occupant based on the estimated skeleton size of the occupant.

8. The physique determination apparatus according to claim 3, wherein
estimating the skeleton size includes estimating the skeleton size using a size of the arm estimated by estimating the sizes of the parts and maximized through a change over time.

9. The physique determination apparatus according to claim 6, wherein
outputting outputs the determined physique to an abandonment detection device configured to determine whether the occupant is a child or not from the physique of the occupant and determine that abandonment has occurred when only the child is present in the vehicle.

* * * * *